Aug. 13, 1929.    C. SPIERER    1,724,527

APPARATUS FOR LIGHTING OBJECTS FOR THE ULTRAMICROSCOPE

Filed April 26, 1927    2 Sheets-Sheet 1

INVENTOR:
Charles Spierer
BY: Luigs, Boyo + Bakeler
ATTORNEYS.

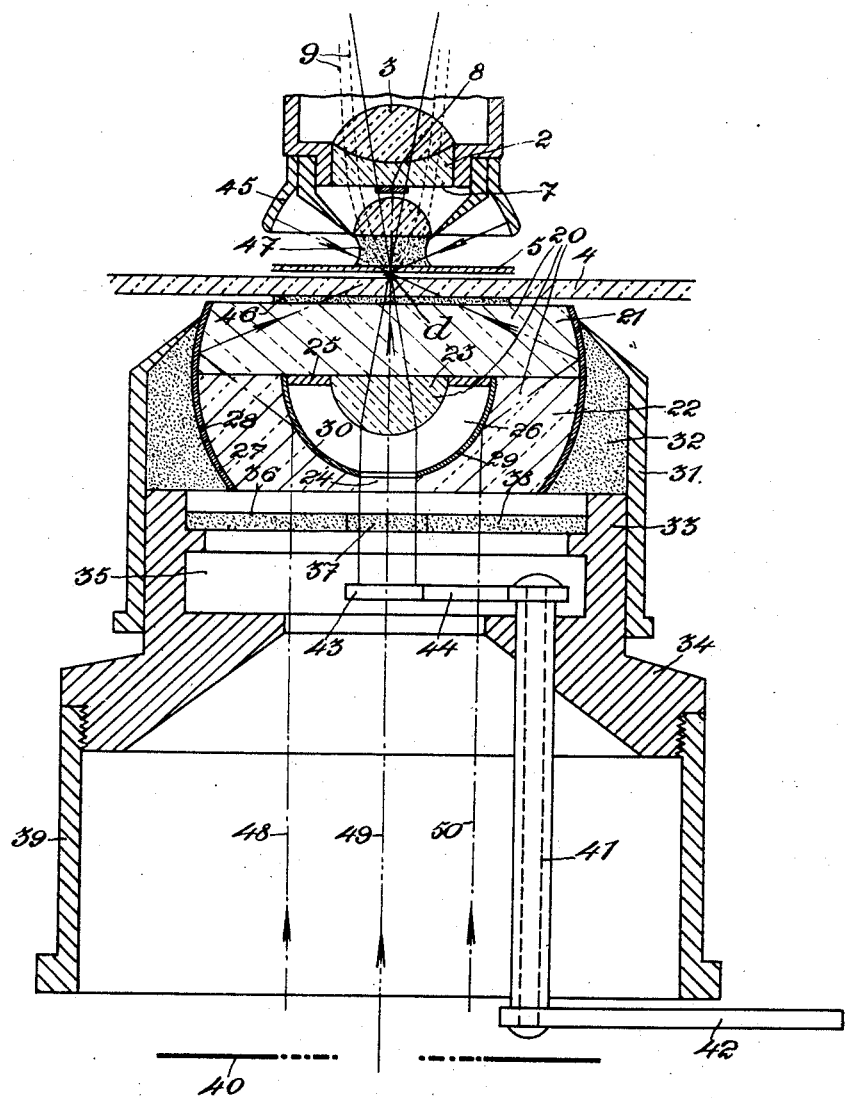

Patented Aug. 13, 1929.

1,724,527

UNITED STATES PATENT OFFICE.

CHARLES SPIERER, OF GENEVA, SWITZERLAND.

APPARATUS FOR LIGHTING OBJECTS FOR THE ULTRAMICROSCOPE.

Application filed April 26, 1927, Serial No. 186,664, and in Switzerland May 6, 1926.

This invention relates to apparatus for lighting objects for the ultra-microscope, and provides an apparatus for carrying the said method into practice.

In all previous apparatus which have been used heretofore for the same purpose the pencils of rays lighting the object are intercepted and absorbed after traversing the latter, while the microscopical image of the object is due to the diffraction of a certain portion of the light by the structures in the object.

The apparatus according to the present invention differs from the apparatus heretofore employed in that the light rays reach the object under various angles of incidence and after passing through it are reflected upon the object so that the latter is lit simultaneously on two different sides.

The herein described apparatus comprises at least one reflecting surface lying beyond the object relatively to the source of light and reflecting upon one side of the object the light rays coming from the other side and traversing the said object. In this invention therefore part of the light is used which otherwise would be absorbed without usefully lighting the object. The latter being lit on both sides, the diffraction phenomena occurring at the level of its particles are highly intensified and the efficiency of the lens is considerably improved as regards ultra-microscopic examination on a black background.

Various constructional examples of the apparatus are diagrammatically illustrated in the accompanying drawings, in which Figures 1 and 2 are axial sections of part of two constructions.

Figure 5 is an axial section through part of another construction.

Figure 1:
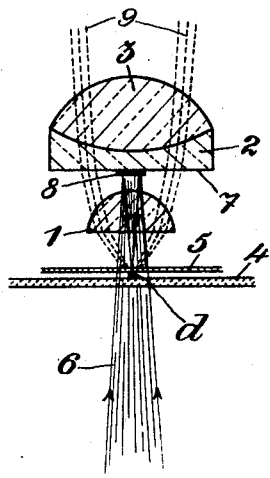

The lens shown in figure 1 comprises the components 1, 2 and 3, the first-mentioned component being hemispherical. A support 4 for the object and a cover slip 5 are shown. The light rays 6 from a source of light (not shown) reach the component 1 after passing through an ordinary Abbe two-lens condenser (not shown) below which is the usual iris diaphragm (not shown). The flat end face 7 of the component 2 has a central circular reflecting surface 8 of small diameter formed for example by a layer of metal deposited on the said face or by a highly polished face of a metal disc. The rays 6 pass through the object $d$ and through the component 1 and on reaching the surface 8 are reflected therefrom on to the object $d$ which is thus lit from above and from below. The rays 9 diffracted by the particles of the object traverse the component 1, pass around the surface 8 and finally reach the eye of the observer.

This construction may also be used for viewing objects by transparency (microscopic examination). To this end the cone of rays 6 is widened by opening the iris diaphragm so that the rays reach the lens directly. The reflecting surface may be formed by a very thin layer of metal (platinum for example) chemically or electrolytically deposited so that it reflects only some of the incident light, the remainder of the light being allowed to pass through to assist in forming the image. The result is mixed lighting on a gray background, this being valuable in certain cases.

When ultra-violet rays are used for lighting, all the lenses of the microscope and of the condenser must be of a material (fused quartz for example) which does not absorb these rays and the reflecting surface must be of a material reflecting ultra-violet rays without unduly absorbing them, for example nickel or magnalium (an alloy of magnesium and aluminium) in the shape of a highly polished disc. The immersion liquid may be glycerine in place of the usual cedar oil which absorbs ultra-violet rays and is rendered fluorescent thereby.

Figure 2:
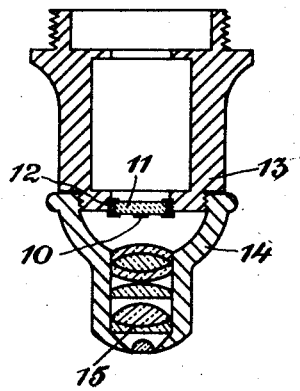

With reference to the construction shown in Figure 2 the reflecting surface is the polished face of a metal disc 10 carried in the centre of a transparent glass disc 11 mounted in a screw-threaded metal ring 12 which is removably screwed into the centre of the lens support 13 to which the shell 14 of the lens proper 15 is screwed. The disc 11 is unscrewed and removed when the lens 15 is to be used for normal microscopic observation by transparency.

Figure 3:
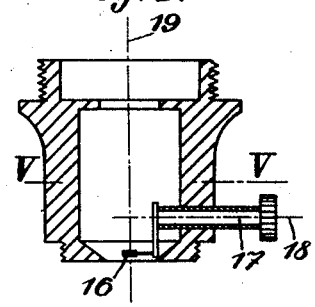
Figures 3 and 4 are respectively an axial section and a cross-section along line V—V of Figure 3 of part of a further construction.
Figure 4:
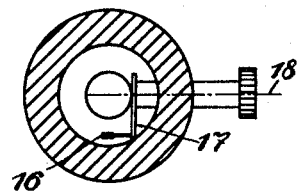

In the construction shown in Figures 3 and 4 the polished metal disc 16, one of the faces of which is the reflecting surface is carried on a crank element 17 adapted to rotate about an axis 18 at right angles to the optical axis 19 so that the disc is at a certain distance from the axis 18. In the position shown in Figure 3 the disc 16 reflects on to the object the rays that have passed therethrough, but in the position shown in Figure 4 the disc does not obstruct the light rays. The reflecting surface now under consideration may be located at any point of the optical axis between the front face (generally flat) of the front component and the rear focal plane of the lens.

The construction shown in Figure 5 comprises an optical system 20 cut in material such as fused quartz which does not intercept ultra-violet rays. The component 21 of this optical system is shaped as a portion of a sphere which portion has unequal bases. The component 22 has the same shape and its large base is joined to the large base of the component 21. The said component 22 has a substantially hemispherical inner cavity 26 in communication with the outside through a circular aperture 24. The component 23 is a hemisphere, the diameter of which is slightly larger than that of the aperture 24. This component is mounted in a blackened metal ring 25 disposed in the cavity 26 against the large base of the component 21 so that the component 23 is held in position without the aid of Canada balsam, which is generally used for cementing optical elements and which becomes fluorescent under the action of ultra-violet rays. The outer and inner spherical surfaces 27 and 29 of the component 22 are provided with metal coverings 28 and 30 (made for example of nickel, or nickel-plated metal or magnalium) reflecting the ultra-violet rays without unduly absorbing them. These coverings may be made in one or more sections one polished face of which accurately fits the faces of the component. The complicated operation of nickel-plating fused quartz surfaces is thus dispensed with.

The optical system 20, shaped as a portion of a sphere with unequal bases, is cemented at 32 to a metal cap 31 which is an easy friction fit on a cylindrical extension 33 of a support 34. This optical system may thus be easily removed together with the cap 31 of the support to give access to the space 35 in which may be disposed transparent screens 36 tinted in one or more colours. The plate 36 shown in the drawing is assumed to have a central portion 37 coloured red for example, and a peripheral portion 38 the colour of which is for example green. The support 34 is screwed on an annular member 39 engaging the condenser holder of the stand of the microscope (not shown). The lighting arrangement has an iris diaphragm 40 shown diagrammatically. A spindle 41 is rotatably mounted in the support parallel to the axis of the latter. One of the ends of this spindle is fitted with a handle 42 which may be moved from outside, and the other end carries a circular opaque screen 43 having a diameter at least equal to that of the aperture 24 which may be masked by the said screen by moving the latter to the required position. The screen 43 is connected to the spindle 41 by a very thin arm 44.

As in the construction shown in Figure 1, the end flat face 7 of the component 2 carries a polished metal disc 8 (of nickel or magnalium) the lower face of which is the surface which reflects light on to the object. In addition to this disc the lens has a small outer reflector 45 the reflecting face of which is of a material which reflects ultra-violet rays without unduly absorbing them. The curvature of this reflecting surface is such that all rays of light striking it are reflected in the direction of the object $d$ when the microscope is focussed thereon. The support 4 and the cover slip 5 are of fused quartz. This construction having an immersion lens a thin layer of glycerine 46 is between the component 21 and the support 4, and a drop of glycerine 47 is between the cover slip 5 and the lens.

This construction is worked as follows: After moving the screen 43 clear of the optical axis and removing the coloured screen 36 the iris diaphragm 40 is fully opened in order to admit to the apparatus a pencil of intense light formed by parallel rays 48, 49, 50. The object is now lit (1) at right angles upwards by the central rays 49; (2) at right angles downwards by the rays 49 after passing through the object and being reflected by the reflecting disc 8; (3) obliquely upwards by the lateral rays 48, 50 coming from all the azimuths after being reflected by the coverings 28, 30; and (4) obliquely downwards by all lateral rays 48, 50 after they have traversed the said object and after being reflected by the reflector 45. None of the rays which thus light the object $d$ enter the lens which therefore receives only the light profusely diffracted and diffused in all directions by the structure or particles of the object, with the consequence that a certain optimum of ultra-microscopic lighting is obtained. When the iris diaphragm 40 is partially closed to let through only a pencil of parallel rays the diameter of which is that of the aperture 24, the lighting is still suitable for ultra-microscopic observation but is derived merely from the rays defined above under (1) and (2). Lighting of this nature is very useful in certain cases. Oblique ultra-microscopic lighting by the rays defined above under (3) and (4) is produced by fully opening the iris diaphragm 40 and masking the aperture 24 by means of the screen 43. A two-colour image is produced by placing the two-colour screen 36 in position and by contriving to utilize the rays mentioned above from (1) to (4). This two-colour image is sometimes very valuable owing to the phenomena of selective coloration produced in the structure of certain objects. This image is on a black background. Finally, when the lens with disc 8 and reflector 45 as described is replaced by an ordinary lens without disc or reflector the image is green on red background. In this image the contrast of complementary colours may be set off with great clearness, and owing to known physiological phenomena, certain very fine structural details appear with remarkable clearness. The experiments made on the same object $d$ may be varied in accordance with the colour screens used or removed; with the aperture of the iris diaphragm; with the position of the screen 43; and finally with the kind of lens used.

It will be seen from the above description that the construction concerned renders it possible to light the object in several ways at will without ever having to displace it, one mode of lighting being instantaneously replaced by another by very simple and easy manipulations. The various modes of lighting may be carried out with ultra-violet light owing to the materials used in the apparatus.

The component 23 of the optical system 20 may be replaced by an achromatic or aplanatic system having two or more components.

The covering 30 of the surface 29 may be dispensed with because the said surface receives all the light useful for ultra-microscopic lighting at such an incidence, relatively to the elements of its surface, that this light must theoretically be reflected by simple total reflection on the smooth surface of quartz. The reflecting surface which is on the outer face of the component 22 may be formed by Wood alloy fusible at 75° and poured at 32 for holding the optical system 20 in position. This alloy, the constituents of which are bismuth, tin, lead and cadmium in variable proportions, reflects ultra-violet rays (with relatively low absorption) and ordinary light.

When ultra-violet light is not used with this apparatus it is not necessary that all the transparent optical elements should be of fused quartz, or that the reflecting surfaces should be of nickel, nickel-plated metal or magnalium, or again that the immersion liquid should be glycerine. These surfaces may be silvered and the liquid may be cedar oil. It is also possible to utilize only the central portion of the optical system 20 for ultra-violet ray lighting. The said system may be mounted directly in the cap 31.

What I claim is:

1. In an apparatus for lighting objects to be viewed ultra-microscopically, the combination with a source of light for projecting light rays toward one side of the object, of means for causing said rays to traverse said object, and at least one reflecting surface located beyond the object relatively to the source of light and adapted to reflect said light rays on another side of said object.

2. In an apparatus of the character described, the combination of a microscope and a source of light for projecting light rays toward one side of an object to be viewed, of means for causing said rays to traverse said object, and a reflecting surface disposed on the front surface of a component of the lens of the microscope and located beyond the object relatively to the source of light, said reflecting surface being adapted to reflect said rays on another side of said object.

3. In an apparatus for lighting objects to be viewed ultra-microscopically, the combination with a source of light for projecting light rays toward one side of the object, of means for causing said rays to traverse said object, and a removable reflecting surface located beyond the object relatively to the source of light and adapted to reflect said light rays on another side of said object.

4. In an apparatus for lighting objects to be viewed ultra-microscopically, the combination with a source of light for projecting light rays toward one side of the object, of a movable member supporting a reflecting surface normally disposed in the optical axis of said source of light and located beyond the object relatively to the source of light, said reflecting surface being adapted to reflect said light rays on the opposite side of said object, and means for moving said reflecting surface out of the optical axis of the light source.

5. In an apparatus for lighting objects to be viewed ultra-microscopically, the combination with a source of light for projecting light rays toward one side of the object, of means for causing said rays to traverse said object, and at least one reflecting surface located beyond the object relatively to the source of light and adapted to reflect said light rays on another side of said object, said reflecting surface being of such character that only part of the rays reaching said surface are reflected, while another part of said rays are allowed to pass through.

6. In an apparatus for lighting objects to be viewed ultra-microscopically, the combination with a source of light, of means for projecting light rays to the object in a direction parallel to the optical axis and obliquely to the latter, and two surfaces located beyond the object relatively to the source of light and reflecting upon one side of the object, light rays reaching the object on the other side and traversing the said object, said surfaces being disposed so that one surface reflects the parallel rays on the object and the other surface reflects the oblique rays on the said object.

7. In an apparatus for lighting objects to be viewed ultra-miscroscopically, the combination with a source of light of an optical system for sending light rays to the object in a direction parallel to the optical axis and obliquely to the latter, said optical system being constituted of three juxtaposed components, the first component being in the shape of a portion of sphere with a reflecting surface, the second being likewise in the shape of a portion of a sphere having an inner hemi-spherical cavity and reflecting spherical surfaces, the said cavity being in communication with the outside through an aperture provided in the optical axis, the third component being hemi-spherical and located in the said cavity, and of two surfaces located beyond the objects relatively to the source of light and reflecting upon one side of the object the light rays reaching the object on the other side and traversing the said object, said surfaces being disposed so that one surface reflects the parallel rays on the object and the other surface reflects the oblique rays on the said object.

8. In an apparatus for lighting objects to be viewed ultra-microscopically the combination with a source of light of an optical system for sending light rays to the object in a direction parallel to the optical axis and obliquely to the latter, said optical system being constituted of three juxtaposed components, the first component being in the shape of a portion of sphere with a reflecting surface, the second being likewise in the shape of a portion of a sphere having an inner hemi-spherical cavity and reflecting spherical surfaces, the said cavity being in communication with the outside through an aperture provided in the optical axis, the third component being hemi-spherical and located in the said cavity and being held therein through a fixing member and of two surfaces located beyond the objects relatively to the source of light and reflecting upon one side of the object the light rays reaching the object on the other side and traversing the said object, said surfaces being disposed so that one surface reflects the parallel rays on the object and the other surface reflects the oblique rays on the said object.

9. In an apparatus for lighting objects to be viewed ultra-microscopically the combination with a source of light of an optical system for sending light rays to the object in a direction parallel to the optical axis and obliquely to the latter, said optical system being constituted of three juxtaposed components, the first component being in the shape of a portion of sphere with a reflecting surface constituted by a metal member secured to the element, the second being likewise in the shape of a portion of sphere having an inner hemi-spherical cavity and reflecting spherical surfaces constituted by a metal member secured to the element, the said cavity being in communication with the outside through an aperture provided in the optical axis, the third component being hemi-spherical and located in the said cavity, and of two surfaces located beyond the objects relatively to the source of light and reflecting upon one side of the object the light rays reaching the object on the other side and traversing the said object, said surfaces being disposed so that one surface reflects the parallel rays on the object and the other surface reflects the oblique rays on the said object.

10. In an apparatus for lighting objects to be viewed ultra-microscopically the combination with a source of light of an optical system for sending light rays to the object in a direction parallel to the optical axis and obliquely to the latter, said optical system being constituted of three juxtaposed components, the first component being in the shape of a portion of sphere with a reflecting surface, the second being likewise in the shape of a portion of a sphere having an inner hemi-spherical cavity and reflecting spherical surfaces, the said cavity being in communication with the outside through an aperture provided in the optical axis, the third component being hemi-spherical and located in the said cavity, the said optical system being easily removable, in order that a removable coloured screen may be placed between the source of light and the said system, and of two surfaces located beyond the objects relatively to the source of light and reflecting upon one side of the object, the light rays reaching the object on the other side and traversing the said object, said surfaces being disposed so that one surface reflects the parallel rays on the object and the other surface reflects the oblique rays on the said object.

In testimony whereof I affix my signature.

CHARLES SPIERER.